United States Patent
Wang et al.

(10) Patent No.: US 11,790,517 B2
(45) Date of Patent: Oct. 17, 2023

(54) SUBTLE DEFECT DETECTION METHOD BASED ON COARSE-TO-FINE STRATEGY

(71) Applicant: Nanjing University of Aeronautics and Astronautics, Nanjing (CN)

(72) Inventors: Jun Wang, Nanjing (CN); Zhongde Shan, Nanjing (CN); Shuyi Jia, Nanjing (CN); Dawei Li, Nanjing (CN); Yuxiang Wu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/306,166

(22) Filed: Apr. 24, 2023

(65) Prior Publication Data
US 2023/0260101 A1     Aug. 17, 2023

(30) Foreign Application Priority Data
May 6, 2022   (CN) .......................... 202210483136.7

(51) Int. Cl.
*G06T 7/00*    (2017.01)
*G06T 7/73*    (2017.01)

(52) U.S. Cl.
CPC ............... *G06T 7/0004* (2013.01); *G06T 7/73* (2017.01); *G06T 2207/20016* (2013.01); *G06T 2207/20081* (2013.01)

(58) Field of Classification Search
CPC .................... G06T 7/0004; G06T 7/73; G06T 2207/20016; G06T 2207/20081
See application file for complete search history.

(56) References Cited

U.S. PATENT DOCUMENTS

| | | | |
|---|---|---|---|
| 2017/0357895 A1* | 12/2017 | Karlinsky | ................ G06N 3/08 |
| 2020/0257100 A1* | 8/2020 | Putman | ................ G06V 20/693 |
| 2021/0383557 A1* | 12/2021 | Brauer | ................ G06T 7/001 |
| 2022/0059316 A1* | 2/2022 | Bhattacharyya | .... H01J 37/3045 |

FOREIGN PATENT DOCUMENTS

| | | |
|---|---|---|
| CN | 111768388 A | 10/2020 |
| CN | 113052103 A | 6/2021 |

* cited by examiner

*Primary Examiner* — Ping Y Hsieh

(57) ABSTRACT

A subtle defect detection method based on coarse-to-fine strategy, including: (S1) acquiring data of an image to be detected via a charge-coupled device (CCD) camera; (S2) constructing a defect area location network and preprocessing the image to be detected to initially determine a defect position; (S3) constructing a defect point detection network; and training the defect point detection network by using a defect segmentation loss function; and (S4) subjecting subtle defects in the image to be detected to quantitative extraction and segmentation via the defect point detection network.

8 Claims, 4 Drawing Sheets

SUBTLE DEFECT DETECTION METHOD BASED ON COARSE-TO-FINE STRATEGY

CROSS-REFERENCE TO RELATED APPLICATIONS

This application claims the benefit of priority from Chinese Patent Application No. 202210483136.7, filed on May 6, 2022. The content of the aforementioned application, including any intervening amendments thereto, is incorporated herein by reference in its entirety.

TECHNICAL FIELD

This application relates to defect detection, and more particularly to a subtle defect detection method based on coarse-to-fine strategy.

BACKGROUND

With the rapid development of science and technology, the requirement for various industrial products become increasingly strict. In the traditional industrial manufacturing, surface defects are detected mainly by manual operation, which has low efficiency and large labor consumption. Moreover, in the manual detection, many subtle defects on the workpiece will be missed due to the randomness and diversity in type and size of the defects, leading to poor detection precision and unsatisfactory product quality.

With the emergence and development of artificial intelligence technology, machine vision-based image surface defect detection strategies have been developed, which have a significantly improved detection efficiency, and have been widely applied in road and tunnel engineering detection, workpiece surface quality inspection and aerospace manufacturing. This detection method eliminates the subjective errors in the manual detection, but still fails to enable the precise detection of subtle defects of the products.

SUMMARY

An objective of this application is to provide a subtle defect detection method based on coarse-to-fine strategy to overcome the problems of high missing detection rate and low detection accuracy, and the inability to accurately locate and extract subtle defects in the existing manual detection. In the defect detection method provided herein, the micro defects on the object surface can be accurately located and classified, so as to lower the missing detection rate and improve the detection accuracy and efficiency of subtle defects.

Technical solutions of this application are described as follows.

This application provides a method for detecting micro defects based on coarse-to-fine strategy, comprising:
- (S1) acquiring data of an image to be detected via a charge-coupled device (CCD) camera;
- (S2) constructing a defect area location network and preprocessing the image to be detected to initially determine a defect position;
- (S3) constructing a defect point detection network; and training the defect point detection network by using a defect segmentation loss function; and
- (S4) according to the defect position initially determined in step (S2), subjecting a subtle defect in the image to be detected to quantitative extraction and segmentation by using the defect point detection network.

In an embodiment, step (S2) further comprises:
- (21) constructing the defect area location network, wherein the defect area location network comprises a backbone network, a classification network and a regression network;
- (22) inputting the image to be detected into the backbone network; and extracting defect information from the image to be detected via a 1×1 convolution kernel and a 3×3 convolution kernel;
- (23) inputting the defect information to the classification network and the regression network to initially determine the defect position; wherein the classification network is configured to predict whether anchor boxes have the same defect feature; and the regression network is configured to predict a position of each of the anchor boxes.

In an embodiment, the classification network and the regression network share a feature weight at the same level; wherein first five layers of a backbone in the backbone network are composed of four convolutional layers and one pooling layer.

In an embodiment, the defect point detection network comprises a backbone network comprising six stages, a bidirectional feature pyramid network, a classification network and a regression network;
- an input image of the backbone network comprising the six stages is an image output by the defect area location network, and the backbone network is configured to extract a defect feature of the input image;
- in the six stages, a first stage comprises a convolutional layer and a 7×7 convolution kernel;
- a second stage comprises a 3×3 max-pooling layer and a first dense block;
- the second stage further comprises alternating 1×1 and 3×3 convolution kernels a third stage is composed of a second dense block; a fourth stage is composed of a third dense block structurally different from the second dense block;
- the third stage and the fourth stage are configured to accelerate transmission of the defect feature and improve utilization of a defect feature image;
- a fifth stage is composed of two dilated bottleneck layers to capture subtle target defect features; and
- a sixth stage is composed of a dilated bottleneck layer to avoid loss of the subtle target defect features.

In an embodiment, the bidirectional feature pyramid network is configured to perform fusion feature mapping on an input defect feature through steps of:
- acquiring information of different defect features through bidirectional connection; and balancing the defect features at different layers by variable-weighted feature fusion through the following equation:

$$O = \sum_{i}^{1} \frac{w_i}{\varepsilon + \sum_{j} w_j} \cdot I_i;$$

wherein O is an output feature of the bidirectional feature pyramid network; $w_i$ is a guaranteed variable weight, and $w_i \geq 0$; $\varepsilon$ is a parameter that avoids a denominator from being zero; and $l_i$ represents a feature from an i-th layer.

In an embodiment, the classification network is configured to predict the defect position; and the regression network is configured to perform detect location and regression, and output a defect identification-location-detection image.

In an embodiment, the classification network and the regression network each comprises two convolution kernels; and the classification network and the regression network share a common input feature mapping as fusion feature mapping.

In an embodiment, in step (S3), the defect segmentation loss function is used to train a precision of the defect point detection network;
wherein the defect segmentation loss function comprises a semantic segmentation loss $L_{ss}$, edge loss $L_e$, a first regularization loss function and a second regularization loss function;
the semantic segmentation loss $L_{ss}$ is configured to predict a semantic segmentation $f$ by using standard cross entropy (CE) loss; and the edge loss $L_e$, is configured to predict a feature mapping s by using standard binary cross entropy (BCE) loss; wherein the semantic segmentation loss $L_{ss}$ is defined as follows:

$$L_{ss}=\lambda_1 L_{CE}(\hat{f},f);$$

the edge loss $L_e$ is defined as follows:

$$L_e=\lambda_2 L_{BCE}(s,\hat{s});$$

wherein $\hat{f}$ and $\hat{s}$ are defect labels; $\lambda_1$ and $\lambda_2$ are two balance parameters, and $\lambda_1$ and $\lambda_2 \in [0.1]$.

In an embodiment, last two parts of the defect segmentation loss function are the first regularization loss function and the second regularization loss function;
the first regularization loss function is configured to avoid a mismatch between a defect edge and a predicted edge, defined as follows:

$$L_{r1}=\lambda_3 \Sigma_p +|\zeta(p^+)-\hat{\zeta}(p^+)|;$$

wherein $\zeta$ is a confidence value indicating whether a pixel belongs to a value of the defect edge; $p^+$ is set of predicted pixel coordinates; and $\hat{\zeta}$ is a similarity value;
the second regularization loss function is configured to match semantic prediction by using edge prediction to prevent overfitting, defined as follows:

$$L_{r2} = \lambda_4 \sum_{k,p} 1_{s,p}[\hat{y_p}\log p(y_p^k \mid r, s)];$$

$$1_{s,p}=\{1:s>thrs\};$$

wherein p indicates a pixel set; k indicates a label set; $1_{s,p}$ is an indicator function; thrs is a threshold; $\zeta_3$ and $\lambda_4$ are two balance parameters to optimize segmentation performance.

Compared with the prior art, this application has the following beneficial effects.

Regarding the method provided herein, after acquiring an image of the object to be detected, the subtle defects in the image can be accurately recognized and located, and thus the missing detection and false detection can be effectively eliminated, thereby improving the defect detection accuracy.

DETAILED DESCRIPTION OF EMBODIMENTS

This application will be described in detail below with reference to the accompanying drawings and embodiments.

Figure 1:
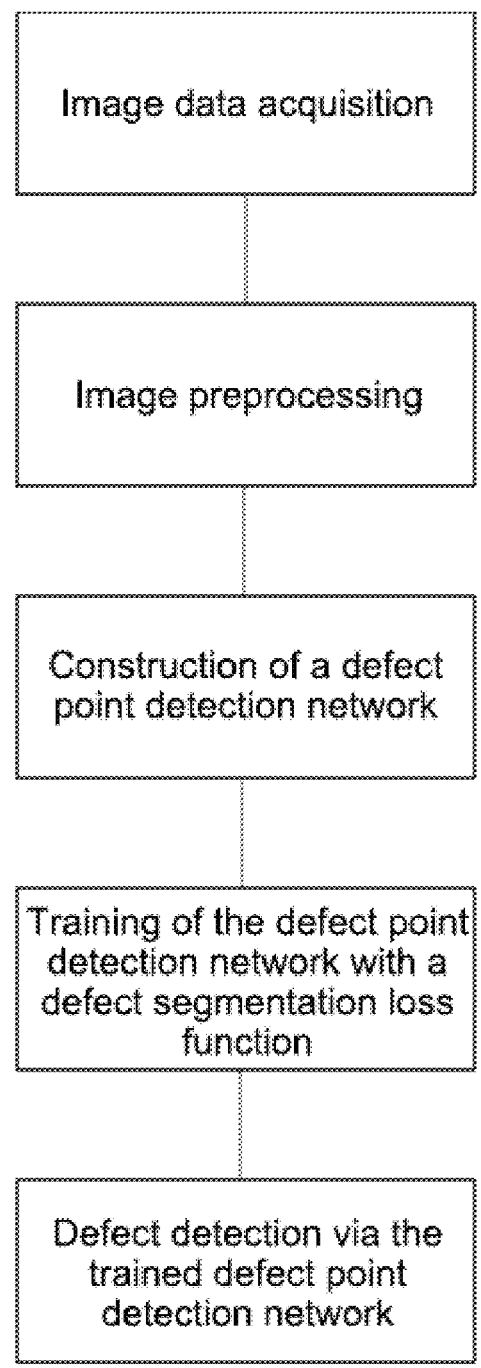
FIG. 1 is a flow chart of a subtle defect detection method based on coarse-to-fine strategy according to an embodiment of this application.

Referring to an embodiment shown in FIG. 1, a subtle defect detection method based on coarse-to-fine strategy is provided, which is performed as follows.

Figure 3:
FIG. 3 shows surface image information of an object obtained by a camera according to an embodiment of this application.

(S1) Data of an image to be detected (high-resolution target image) is acquired via a high-resolution charge-coupled device (CCD) camera (as shown in FIG. 3).

(S2) The image to be detected is preprocessed. Specifically, the acquired image data is input into a localization module followed by rough detection of the image to be detected to roughly locate and extract defects and reduce the interference resulted by complex backgrounds.

A defect area location network is constructed and the image to be detected is preprocessed by using the defect area location network to initially determine a defect position. Step (S2) is further performed as follows.

(21) The defect area location network is constructed. The defect area location network includes a backbone network, a classification network and a regression network.

(22) The image to be detected is input into the backbone network. Defect information is extracted from the image to be detected via a 1×1 convolution kernel and a 3×3 convolution kernel.

(23) The defect information is input into the classification network and the regression network to initially determine the defect position. The classification network is configured to predict whether anchor boxes have the same defect feature; and the regression network is configured to predict a position of each of the anchor boxes.

The classification network and the regression network share a feature weight at the same level.

First five layers of a backbone in the backbone layer network are composed of four convolutional layers and one pooling layer. A small number of convolutional layers is capable of reducing redundant calculation and accelerating defect detection.

(S3) The image output by the rough detection is input into a fine detection module (ie, a defect point detection network) to improve the accuracy of defect extraction and determination.

The defect point detection network is constructed. And then, the defect point detection network is trained by using a defect segmentation loss function to extract defect feature from the preprocessed the image surface.

Figure 2:
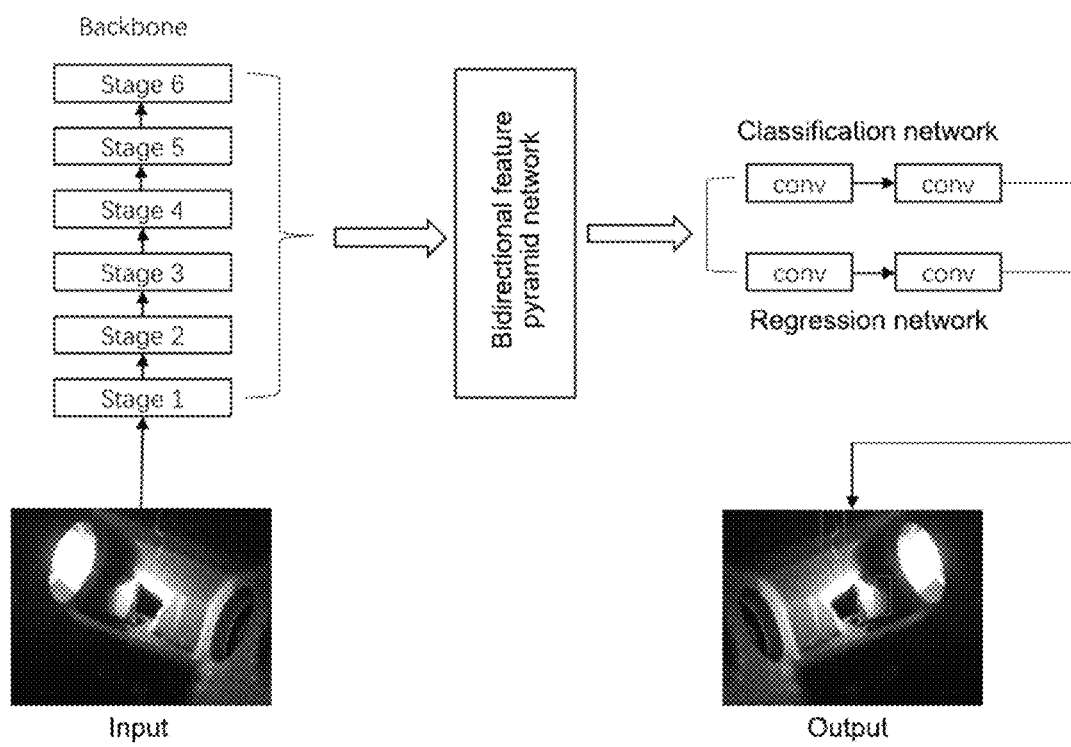
FIG. 2 shows a framework of a defect point detection network according to an embodiment of this application.

Referring to an embodiment shown in FIG. 2, the defect point detection network includes a backbone network comprising six stages, a bidirectional feature pyramid network, a classification network and a regression network.

1. An input image of the backbone network comprising the six stages is an image output by the defect area location network, and the backbone network is configured to extract a defect feature of the input image.

The backbone network in the defect point detection network is designed. The preprocessed image data is input into the backbone network. The backbone network includes six stages, which is shown in Table 1.

TABLE 1

Backbone network in defect area location network

| Stage | Layer | Backbone network | Output size |
|---|---|---|---|
| First stage | Convolutional layer | 7 × 7 convolution kernel, stride is 2 | 112 × 112 |
| Second stage | Pooling layer | 3 × 3 max-pooling layer, stride is 2 | 56 × 56 |
| | Dense block | $\begin{bmatrix} 1\times 1\text{conv} \\ 3\times 3\text{conv} \end{bmatrix} \times 6$ | |
| Third stage | Dense block | $\begin{bmatrix} 1\times 1\text{conv} \\ 3\times 3\text{conv} \end{bmatrix} \times 12$ | 28 × 28 |
| Fourth stage | Dense block | $\begin{bmatrix} 1\times 1\text{conv} \\ 3\times 3\text{conv} \end{bmatrix} \times 24$ | 14 × 14 |
| Fifth stage | Bottleneck | $\begin{bmatrix} 1\times 1\text{conv} \\ 3\times 3, \text{dilate2,256} \\ 1\times 1\text{conv} \end{bmatrix} + 1\times 1\text{conv}$ | 14 × 14 |
| | | $\begin{bmatrix} 1\times 1\text{conv} \\ 3\times 3, \text{dilate2,256} \\ 1\times 1\text{conv} \end{bmatrix} \times 2$ | |
| Sixth stage | Bottleneck | $\begin{bmatrix} 1\times 1\text{conv} \\ 3\times 3, \text{dilate2,256} \\ 1\times 1\text{conv} \end{bmatrix} \times 24 + 1\times 1\text{conv}$ | 14 × 14 |
| | | $\begin{bmatrix} 1\times 1\text{conv} \\ 3\times 3, \text{dilate2,256} \\ 1\times 1\text{conv} \end{bmatrix} \times 1$ | |

In the six stages, a first stage includes a convolutional layer and a 7×7 convolution kernel.

A second stage includes a 3×3 max-pooling layer and a dense block; A third stage is composed of a dense block. A fourth stage is composed of a dense block structurally different from the dense block of the third stage. The third stage and the fourth stage are configured to accelerate transmission of the defect feature and improve utilization of a defect feature image.

A fifth stage is composed of two dilated bottleneck layers to capture subtle target defect features.

A sixth stage is composed of a dilated bottleneck layer to avoid loss of the subtle target defect features.

2. The defect feature is extracted from the backbone network and input into the bidirectional feature pyramid network.

The bidirectional feature pyramid network is configured to perform fusion feature mapping on an input defect feature, which is performed as follows.

Information of different defect features is acquired through a bidirectional connection. The defect features at different layers are balanced by variable-weighted feature fusion through the following equation:

$$O = \sum_i \frac{w_i}{\varepsilon + \sum_j w_j} \cdot l_i;$$

where O is an output feature of the bidirectional feature pyramid network; $w_i$ is a guaranteed variable weight, and $w_i \geq 0$; $\varepsilon$ is a parameter that avoids a denominator from being zero; and $l_i$ represents a feature from an i-th layer.

3. The defect position is predicted, and the defect is subjected to location and regression.

The classification network is configured to predict the defect position from the image to be detected. The regression network is configured to perform data location and regression, and output a defect identification-location-detection image. The classification network and the regression network each includes two convolution kernels. The classification network and the regression network share a common input feature mapping as fusion feature mapping.

4. The defect segmentation loss function is used to train a precision of the defect point detection network, and the quantitative segmentation and extraction of the subtle defect are performed by using the defect segmentation loss function. The defect segmentation loss function includes semantic segmentation loss $L_{ss}$, edge loss $L_e$, a first regularization loss function and a second regularization loss function.

The semantic segmentation loss $L_{ss}$ is configured to predict a semantic segmentation f by using standard cross entropy (CE) loss, and the edge loss $L_e$ is configured to predict a feature mapping s by using standard binary cross entropy (BCE) loss, where the semantic segmentation loss $L_{ss}$ is defined as follows:

$$L_{ss} = \lambda_1 L_{CE}(\hat{f}, f); \text{ and}$$

the edge loss $L_e$ is defined as follows:

$$L_e = \lambda_2 L_{BCE}(s, \hat{s});$$

where $\hat{f}$ and $\hat{s}$ are defect labels; $\lambda_1$ and $\lambda_2$ are two balance parameters, and $\lambda_1$ and $\lambda_2 \in [0.1]$.

The last two parts of the defect segmentation loss function are the first regularization loss function and the second regularization loss function.

The first regularization loss function is configured to avoid a mismatch between a defect edge and a predicted edge, defined as follows:

$$L_{r1} = \lambda_3 \sum_{p^+} |\zeta(p^+) - \hat{\zeta}(p^+)|;$$

where $\zeta$ is a confidence value indicating whether pixel belongs to a value of the defect edge; $p^+$ is a set of predicted pixel coordinates; and $\hat{\zeta}$ is a similarity value.

The second regularization loss function is configured to match semantic prediction by using edge prediction to prevent overfitting, defined as follows:

$$L_{r2} = \lambda_4 \sum_{k,p} 1_{s,p} [\hat{y}_p^k \log p(y_p^k \mid r, s)];$$

$$1_{s,p} = \{1 : s > thrs\};$$

where p indicates a pixel set; k indicates a label set; $1_{s,p}$ is an indicator function; thrs is a threshold; $\lambda_3$ and $\lambda_4$ are two balance parameters to optimize segmentation performance.

In this embodiment, the thrs is set to be 0.8, $\lambda_3$ is set to be 0.15, $\lambda_4$ is set to be 0.12 to optimize the segmentation performance.

Figure 4:
FIG. 4 depicts results obtained by the subtle-defect detection method based on coarse-to-fine strategy according to an embodiment of this application.

(S4) According to the defect position initially determined in step (S2), a subtle defect in the image to be detected is subjected to quantitative extraction and segmentation by using the defect point detection network. The defect point detection network trained in step (S3) is used to perform defect identification-location-detection on the image data by using the defect segmentation loss function, so as to accurately and effectively detect the subtle defects. In this embodiment, the result obtained by the method provided herein is exhibited in FIG. 4.

Described above are merely preferred embodiments of the disclosure, which are not intended to limit the scope of the application. Any technical solutions made within the idea of this disclosure shall fall within the protection scope of this application; It should be understood by those skilled in the art that any and changes and modifications made without departing from the spirit of the application shall fall within the scope of the present application defined by the appended claims.

What is claimed is:

1. A subtle defect detection method based on coarse-to-fine strategy, comprising:
   (S1) acquiring data of an image to be detected via a charge-coupled device (CCD) camera;
   (S2) constructing a defect area location network and preprocessing the image to be detected to initially determine a defect position;
   (S3) constructing a defect point detection network; and training the defect point detection network by using a defect segmentation loss function; and
   (S4) according to the defect position initially determined in step (S2), subjecting a subtle defect in the image to be detected to quantitative extraction and segmentation by using the defect point detection network;
   wherein the defect point detection network comprises a backbone network comprising six stages, a bidirectional feature pyramid network, a classification network and a regression network;
   an input image of the backbone network is an image output by the defect area location network, and the backbone network is configured to extract a defect feature of the input image;
   in the six stages, a first stage comprises a convolutional layer and a 7×7 convolution kernel;
   a second stage comprises a 3×3 max-pooling layer and a first dense block;
   the second stage further comprises alternating 1×1 and 3×3 convolution kernels;
   a third stage is composed of a second dense block; a fourth stage is composed of a third dense block structurally different from the second dense block;
   the third stage and the fourth stage are configured to accelerate transmission of the defect feature and improve utilization of a defect feature image;
   a fifth stage is composed of two dilated bottleneck layers to capture subtle target defect features; and
   a sixth stage is composed of a dilated bottleneck layer to avoid loss of the subtle target defect features.

2. The subtle defect detection method of claim 1, wherein step (S2) comprises:
   (21) constructing the defect area location network, wherein the defect area location network comprises a backbone network, a classification network and a regression network;
   (22) inputting the image to be detected into the backbone network; and extracting defect information from the image to be detected via a 1×1 convolution kernel and a 3×3 convolution kernel;
   (23) inputting the defect information to the classification network and the regression network to initially determine the defect position; wherein the classification network is configured to predict whether anchor boxes have the same defect feature; and the regression network is configured to predict a position of each of the anchor boxes.

3. The subtle defect detection method of claim 2, wherein the classification network and the regression network share a feature weight at the same level; wherein first five layers of a backbone in the backbone network are composed of four convolutional layers and one pooling layer.

4. The subtle defect detection method of claim 1, wherein the bidirectional feature pyramid network is configured to perform fusion feature mapping on an input defect feature through steps of:
   acquiring information of different defect features through bidirectional connection; and balancing the defect features at different layers by variable-weighted feature fusion through the following equation:

$$O = \sum_i^1 \frac{w_i}{\varepsilon + \sum_j w_j} \cdot I_i;$$

wherein O is an output feature of the bidirectional feature pyramid network; $w_i$ is a guaranteed variable weight, and $w_i \geq 0$; $\varepsilon$ is a parameter that avoids a denominator from being zero; and $l_i$ represents a feature from an i-th layer.

5. The subtle defect detection method of claim 1, wherein the classification network is configured to predict the defect position; and the regression network is configured to perform defect location and regression, and output a defect identification-location-detection image.

6. The subtle defect detection method of claim 5, wherein the classification network and the regression network each comprises two convolution kernels; and the classification network and the regression network share a common input feature mapping as fusion feature mapping.

7. The subtle defect detection method of claim 1, wherein in step (S3), the defect segmentation loss function is used to train a precision of the defect point detection network;
   wherein the defect segmentation loss function comprises semantic segmentation loss $L_{ss}$, edge loss $L_e$, a first regularization loss function and a second regularization loss function;
   the semantic segmentation loss $L_{ss}$ is configured to predict a semantic segmentation f by using standard cross entropy (CE) loss, and the edge loss $L_e$ is configured to predict a feature mapping s by using standard binary cross entropy (BCE) loss; wherein the semantic segmentation loss $L_{ss}$ is defined as follows:

$$L_{ss} = \lambda_1 L_{CE}(\hat{f}, f);$$

the edge loss $L_e$ is defined as follows:

$$L_e = \lambda_2 L_{BCE}(s, \hat{s});$$

wherein $\hat{f}$ and $\hat{s}$ are defect labels; $\lambda_1$ and $\lambda_2$ are two balance parameters, and $\lambda_1$ and $\lambda_2 \in [0.1]$.

8. The subtle defect detection method of claim 7, wherein last two parts of the defect segmentation loss function are the first regularization loss function and the second regularization loss function;

the first regularization loss function is configured to avoid a mismatch between a defect edge and a predicted edge, defined as follows:

$$L_{r1} = \lambda_3 \sum_{p^+} |\zeta(p^+) - \hat{\zeta}(p^+)|;$$

wherein $\zeta$ is a confidence value indicating whether a pixel belongs to a value of the defect edge; $p^+$ is set of predicted pixel coordinates; and $\hat{\zeta}$ is a similarity value;

the second regularization loss function is configured to match semantic prediction by using edge prediction to prevent overfitting, defined as follows:

$$L_{r2} = \lambda_4 \sum_{k,p} 1_{s,p} [\widehat{y_p} \log p(y_p^k \mid r, s)];$$

and $$1_{s,p} = \{1 : s > thrs\};$$

wherein p indicates a pixel set; k indicates a label set; $1_{s,p}$ is an indicator function; thrs is a threshold; $\lambda_3$ and $\lambda_4$ are two balance parameters to optimize segmentation performance.

* * * * *